US 6,648,542 B2

(12) United States Patent
Smith et al.

(10) Patent No.: US 6,648,542 B2
(45) Date of Patent: Nov. 18, 2003

(54) VEHICLES HAVING PARTS CONNECTED WITH A SEALING SPRING FASTENER COMPRISING A CLOSED CAVITY

(75) Inventors: Michael Walter Smith, Lake Zurich, IL (US); Gary John Bobeck, Inglesine, IL (US)

(73) Assignee: Termax Corporation, Schaumburg, IL (US)

(*) Notice: Subject to any disclaimer, the term of this patent is extended or adjusted under 35 U.S.C. 154(b) by 0 days.

(21) Appl. No.: 10/305,449

(22) Filed: Nov. 27, 2002

(65) Prior Publication Data

US 2003/0103801 A1 Jun. 5, 2003

Related U.S. Application Data

(62) Division of application No. 09/757,524, filed on Jan. 10, 2001, now Pat. No. 6,527,471.
(60) Provisional application No. 60/176,883, filed on Jan. 19, 2000.

(51) Int. Cl.[7] ............................. A44B 21/00; F16L 33/00
(52) U.S. Cl. .................. 403/291; 403/297; 403/315; 403/327; 403/329; 403/375; 403/379.6; 403/DIG. 14; 24/293; 277/630; 277/640; 277/648; 277/651; 180/313
(58) Field of Search .................. 180/313; 24/289, 24/293, 294, 297; 52/716.2, 716.5, 716.7, 716.8, 717.04, 717.05, 717.06; 411/508, 509, 510; 277/630, 637, 640, 648, 651; 403/24, 224, 225, 226, 228, 291, 297, 315, 325, 326, 329, 327, 375, 379.6, 408.1, DIG. 4, DIG. 11, DIG. 14

(56) References Cited

U.S. PATENT DOCUMENTS

| | | | |
|---|---|---|---|
| 2,946,612 A | 7/1960 | Ahlgren | 292/17 |
| 4,245,652 A | 1/1981 | Kelly et al. | 128/736 |
| 4,250,599 A | 2/1981 | Nagashima et al. | 24/216 |
| 4,271,634 A | 6/1981 | Andrzejewski | 49/491 |
| 4,324,826 A | 4/1982 | Ginster | 428/122 |
| 4,399,644 A | 8/1983 | Bright | 52/716 |
| 4,402,118 A | 9/1983 | Benedetti | 24/289 |
| 4,778,320 A | 10/1988 | Nakama | 411/509 |
| 4,792,475 A | 12/1988 | Bien | 28/137 |
| 4,865,505 A | 9/1989 | Okada | 411/512 |
| 5,193,961 A | 3/1993 | Hoyle et al. | 411/553 |
| 5,533,237 A | 7/1996 | Higgins | 24/289 |
| 5,542,158 A | 8/1996 | Gronau et al. | 24/295 |
| 5,561,961 A | 10/1996 | Paul | 52/716.7 |
| 6,381,811 B2 | 5/2002 | Smith et al. | 24/289 |

FOREIGN PATENT DOCUMENTS

| | | |
|---|---|---|
| AU | 254071 | 1/1963 |
| CA | 496700 | 10/1953 |
| GB | 884123 | 12/1961 |

*Primary Examiner*—Christopher J. Novosad
(74) *Attorney, Agent, or Firm*—E. Vassiliou

(57) ABSTRACT

This invention relates to a sealing spring fastener, which comprises a U-shaped structure, on which an elastic body has been incorporated. The elastic body has a closed cavity within the U-shaped structure. The sealing spring fastener can form an assembly with an extension of a panel, preferably a plastic panel. The assembly or the fastener by itself can be engaged into the slot of a solid sheet, preferably a metal sheet, in a manner that one side of the sheet is sealed from the other side of the sheet in the vicinity of the slot. This invention also relates to vehicles having parts connected with the above sealing spring fasteners.

16 Claims, 2 Drawing Sheets

VEHICLES HAVING PARTS CONNECTED WITH A SEALING SPRING FASTENER COMPRISING A CLOSED CAVITY

RELATED APPLICATIONS

This is a Division of application Ser. No. 09/757,524, filed Jan. 10, 2001, now U.S. Pat. No. 6,527,471 B2, which is incorporated herein by reference.

This application claims priority of U.S. provisional patent application No. 60/176,883, filed on Jan. 19, 2000, which is incorporated herein by reference in its entirety.

FIELD OF THE INVENTION

This invention relates to spring fasteners, and more particularly to those fasteners which are suitable to be engaged in a slot of a solid sheet and support the extension of a panel in a manner that one side of the solid sheet is sealed from the other side around the slot. This invention a so relates to vehicles having two parts connected with the above fasteners, as well as an assembly of a panel having an extension and a sealing fastener as described above.

BACKGROUND OF THE INVENTION

A number of fasteners have been used in the past for securing one object on another object, as for example, securing an article such as for example a plastic sheet on a metal or other rigid plastic sheet. However, the fasteners being used presently are particularly designed for only a limited number of matching objects to be secured on each other. For sealing purposes, a secondary resilient sheet, or a resilient body attached to the fastener may be used.

Examples of conventional fasteners are disclosed in U.S. Pat. No. 5,987,714 (Smith); U.S. Pat. No. 5,887,319 (Smith); U.S. Pat. No. 5,542,158 (Gronau et al.); U.S. Pat. No. 5,422,789 (Fisher et al.), U.S. Pat. No. 5,373,611 (Murata); U.S. Pat. No. 5,314,280 (Gagliardi); U.S. Pat. No. 5,095,592 (Doerfling); U.S. Pat. No. 4,792,475 (Bien); U.S. Pat. No. 4,683,622 (Ohelke); U.S. Pat. No. 4,609,170 (Schnabl); U.S. Pat. No. 4,245,652 (Kelly et al.); U.S. Pat. No. 3,864,789 (Leitner); U.S. Pat. No. 3,673,643 (Kindell); U.S. Pat. No. 3,525,129 (Holton); U.S. Pat. No. 2,825,948 (Parkin); U.S. Pat. No. 2,607,971 (Bedford, Jr.); U.S. Pat. No. 2,542,883 (Tinnerman); U.S. Pat. No. 2,329,688 (Bedford, Jr.); U.S. Pat. No. 2,322,656 (Murphy), among others.

U.S. Pat. No. 5,887,319; U.S. Pat. No. 5,987,714; patent application Ser. No. 09/493,476, filed Jan. 28, 2000; patent application Ser. No. 09/494,112, filed Jan. 28, 2000;and patent application Ser. No. 09/493,304, filed Jan. 28, 2000; describe fasteners suitable to be used in a slot, and they are all incorporated herein by reference.

SUMMARY OF THE INVENTION

As aforementioned, this invention relates to spring fasteners characterized by a structure suitable to be engaged in a slot. More particularly, this invention pertains a sealing spring fastener comprising:

a U-shaped structure having a first side, a second side, a top end and a bottom end;

a spring leg on each side of the U-shaped structure, extending outwardly from said U-shaped structure in a general direction from the bottom end toward the top end, each spring leg having an attached end and a free end; and an elastic body integrally molded on the U-shaped structure at least with the top end, except at least the free end of each extending leg, the elastic body having a closed cavity within the first side and the second side of said U-shaped structure.

Preferably, the elastic body further comprises a gasket extending away from the closed cavity in the vicinity of the top end.

The elastic body preferably comprises a compound selected from a group consisting of thermoplastic elastomer, silicone, polyurethane, plastisol, and a mixture thereof. More preferably, the elastic body comprises a thermoplastic elastomer, and even more preferably the elastic body has been molded by insert injection molding The free end of each leg is engageable with a slot of a solid sheet. The gasket seals the top of the slot upon engagement of the free end of each slot with the slot of said solid sheet.

The sealing fastener of the present invention preferably further comprises barbs inside the closed cavity having a general direction from the top end toward the bottom end of the U-shaped structure.

This invention also relates to an assembly of a panel having an extension and a sealing spring fastener, according to any of the variations described above, wherein the extension of the panel is inserted into the closed cavity This invention also relates to a vehicle comprising two objects connected with any of the fasteners in any of the variations described above.

DESCRIPTION OF THE DRAWING

The reader's understanding of practical implementation of preferred embodiments of the invention will be enhanced by reference to the following detailed description taken in conjunction with perusal of the drawing figures, wherein.

DETAILED DESCRIPTION OF THE INVENTION

Figure 1:
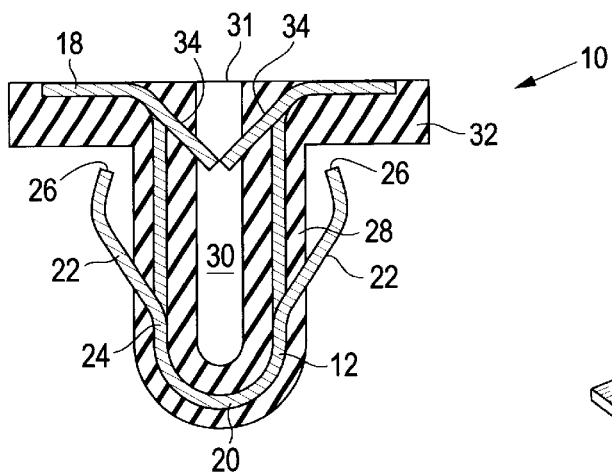
FIG. 1 illustrates a cross-sectional view of a sealing spring fastener according to a preferred embodiment of the present invention.
Figure 2:
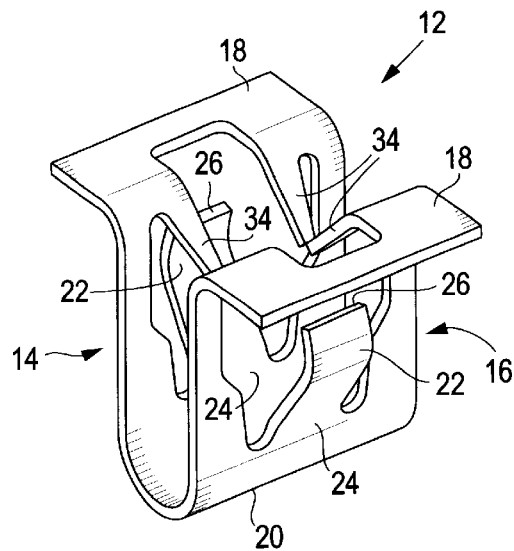
FIG. 2 shows a perspective view of a part of the fastener of FIG. 1 without the elastic body.
Figure 3:
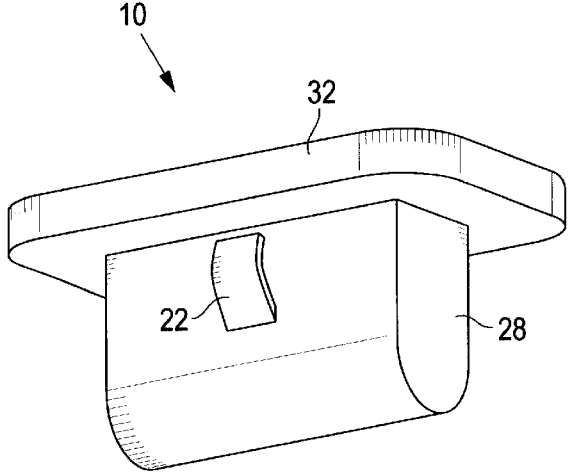
FIG. 3 shows a perspective view of the spring fastener of FIG. 1
Figure 4:
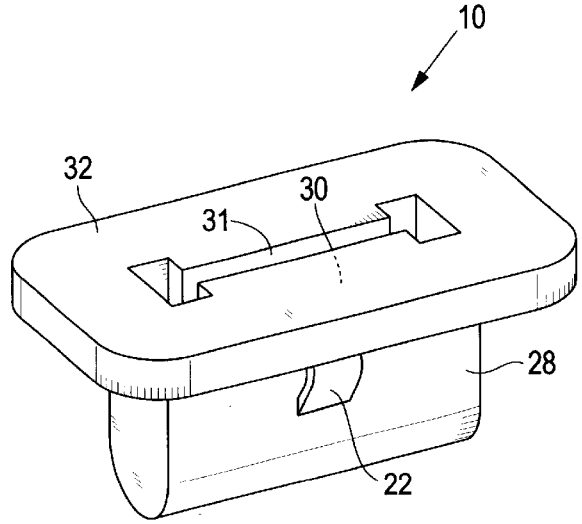
FIG. 4 shows another perspective view of the spring fastener of FIG. 1

As aforementioned, this invention relates to spring fasteners characterized by a structure suitable to be engaged in a slot and secure one article on another article.

More specifically, this invention relates to a sealing spring fastener, which comprises a U-shaped structure, on which an elastic body has been incorporated. The elastic body has a closed cavity within the U-shaped structure. The sealing spring fastener can form an assembly with an extension of a panel, preferably a plastic panel. The assembly or the fastener by itself can be engaged into the slot of a solid sheet, preferably a metal sheet, in a manner that one side of the sheet is sealed from the other side of the sheet.

Referring now to FIGS. 1–4, there is depicted a sealing spring fastener 10, according to a preferred embodiment of the present invention, comprising a U-shaped structure 12 having a first side 14, a second side 16, a top end 18, and a bottom end 20.

On each side 14 and 16 of the U-shaped structure 12 there is a spring leg 22, extending outwardly from the U-shaped structure 12 in a general direction from the bottom end 20 toward the top end 18. Each spring leg 22 has an attached end 24 and a free end 26.

An elastic body 28 is integrally molded on the U-shaped structure 12 at least under the top end 18, with the exception of at least the free end 26 of each extending leg 22. The elastic body 28 has a closed cavity 30 within the first side 14 and the second side 16 of said U-shaped structure 12. The closed cavity 30 has an opening 31. The specific definition of a "closed" cavity is that there is no communication or opening between the cavity and any region outside the cavity except for the opening 31.

The U-shaped structure 12 in the vicinity of the bottom 20, especially under the attached end 24 of the legs 22, may also be uncovered (not shown in the figures) by the elastic body 28, as long as the cavity 30 remains as a closed cavity.

The elastic body may be any elastic material such as for example plastisol or polyurethane, more preferably silicone, and even more preferably a thermoplastic elastomer as described in U.S. provisional patent application No. 60/170,112, filed Dec. 10, 1999, which is incorporated herein by reference. Preferably, the thermoplastic elastomer is molded by insert injection molding, a technique well known to the art.

The free end 26 of each leg 22 is engageable with a slot of a solid sheet. The gasket 32 seals the top of the slot upon engagement of the free end 26 of each leg 22 with the slot of said solid sheet, as it will be illustrated in detail hereinbelow.

The sealing fastener of the present invention preferably further comprises barbs 34 inside the closed cavity having a general direction from the top end 18 toward the bottom end 20 of the U-shaped structure 12.

Figure 5:
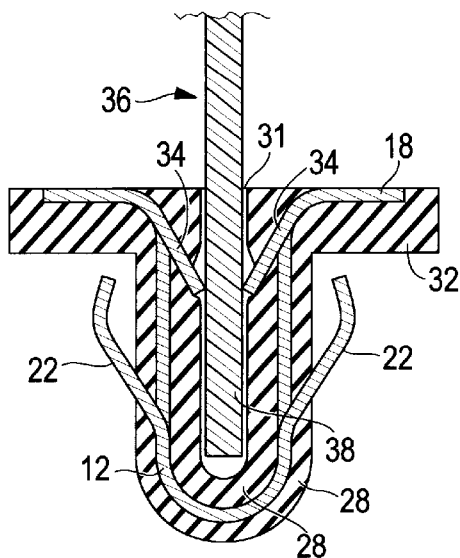
FIG. 5 is a cross-sectional view of an assembly of the extension of a panel and the fastener of FIG. 1, wherein the extension is inserted into the closed cavity of the fastener.

The present invention also pertains an assembly of a panel 36, preferably plastic, which has an extension 38, as better shown in FIG. 5. The extension 38 has preferably a cross sectional shape commensurate to the shape of opening 31 of the closed cavity 30, so that the extension 38 can be inserted through the opening 31, and secured in the closed cavity 30 by the barbs 34.

Figure 6:
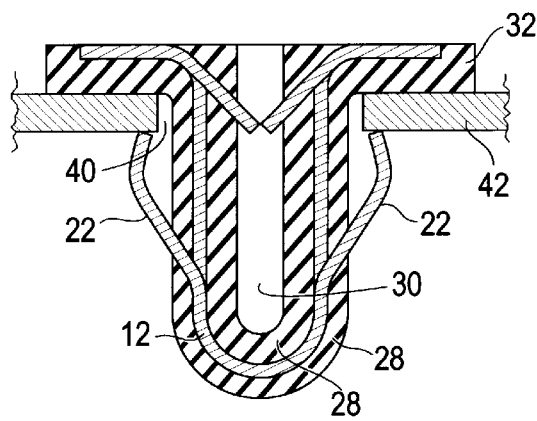
FIG. 6 is a cross-sectional view of the fastener of FIG. 1 engaged into a slot of a solid sheet.

FIG. 6, shows the fastener 10 engaged in a slot 40 of a solid sheet 42, preferably a steel sheet, before insertion of the extension 38 into the closed cavity 30 of the sealing spring fastener 10.

In operation, it is highly preferable that the sealing spring fastener 10 is assembled first with the panel 36 by insertion of the extension 38 into the closed cavity 30, although the fastener may also be engaged into the slot 40, as shown in FIG. 6, before formation of the assembly shown in FIG. 5. This is because during manufacturing the plastic sheet is usually made in one location and transferred to a different location for being placed and secured on the solid sheet in the manufacture of a vehicle, such as an automobile for example. Therefore, it is considerably more convenient, albeit not necessary, to make the assembly of the panel 36 with the fastener 10 at the location of the manufacture of the panel 36 and ship it ready for engagement on the sheet 42 at the location of the final assembly.

The sealing spring fastener 10, after having been assembled with the panel 36, is engaged in the slot 40 of the solid sheet 42. The pressure applied on the gasket 32 of the elastic body, due to the engagement of the legs 22 with the slot 40, seals hermetically said slot 40, taking also into account that the cavity 30 is a closed cavity.

Figure 7:
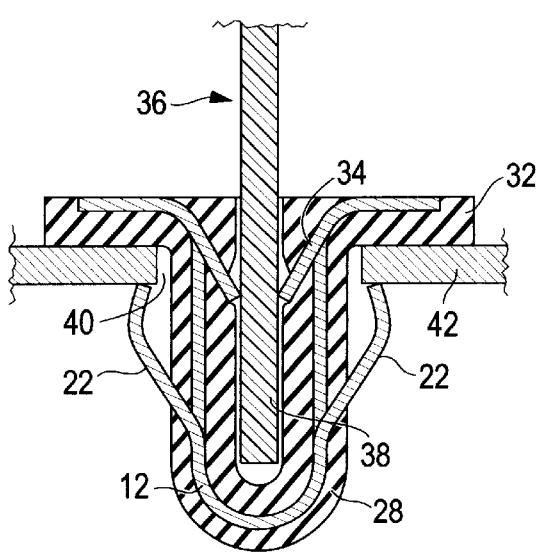
FIG. 7 is a cross-sectional view of the assembly of FIG. 5 engaged into a slot of a solid sheet.
Figure 8:
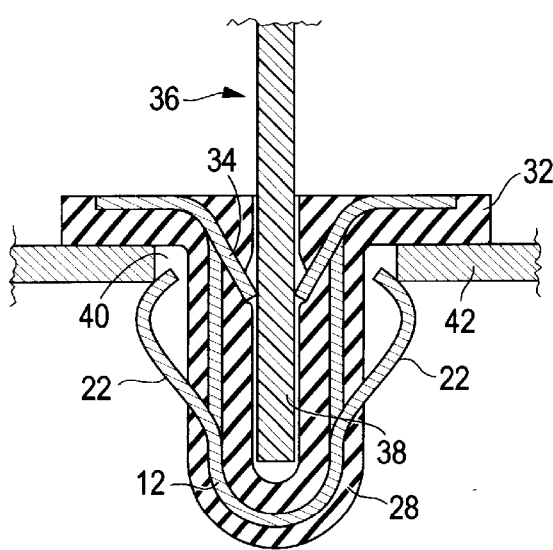
FIG. 8 is a cross-sectional view of an assembly similar to that of FIG. 5 engaged into a slot of a solid sheet, wherein the free ends of the legs remain within the slot.

The arrangements shown in FIGS. 6 and 7 provide a more secure engagement of the assembly with the slot 40. However, if disassembling the arrangement is desired, pulling the panel away from the solid sheet will usually result in leaving the fastener 10 engaged in the slot 40. On the other hand, if the legs 22 are such as to provide the engagement shown in FIG. 8, pulling the panel 36 away from the solid sheet will usually result in leaving the fastener 10 still assembled with the panel 36, provided that the barbs 34 provide adequate grabbing force on the panel 36.

Automobiles or other vehicles may be made, comprising one or more of the fasteners of the instant invention, providing substantial improvements regarding safety, performance and comfort.

Examples of embodiments demonstrating the operation of the instant invention, have now been given for illustration purposes only, and should not be construed as restricting the scope or limits of this invention in any way.

What is claimed is:

1. A vehicle comprising two parts connected with a sealing spring fastener, the sealing spring fastener comprising:
   a U-shaped structure having a first side, a second side, a top end and a bottom end;
   a spring leg on each side of the U-shaped structure, extending outwardly from said U-shaped structure in a general direction from the bottom end toward the top end, each spring leg having an attached end and a free end; and
   an elastic body integrally molded on the U-shaped structure at least under the top end, except at least the free end of each extending leg, the elastic body having a closed cavity within the first side and the second side of said U-shaped structure.

2. A vehicle as defined in claim 1, wherein the elastic body further comprises a gasket extending away from the closed cavity.

3. A vehicle as defined in claim 2, wherein the elastic body comprises a compound selected from a group consisting of thermoplastic elastomer, silicone, polyurethane, plastisol, and a mixture thereof.

4. A vehicle as defined in claim 2, wherein the elastic body comprises a thermoplastic elastomer.

5. A vehicle as defined in claim 4, wherein the thermoplastic elastomer has been molded by injection molding.

6. A vehicle as defined in claim 5, wherein the free end of each leg is engageable with a slot of a solid sheet, and the gasket seals the top of the slot upon engagement of the free end of each slot with the slot of said solid sheet.

7. A vehicle as defined in claim 4, wherein the free end of each leg is engageable with a slot of a solid sheet, and the gasket seals the top of the slot upon engagement of the free end of each slot with the slot of said solid sheet.

8. A vehicle as defined in claim 4, wherein the sealing spring fastener further comprises barbs inside the closed cavity having a general direction from the top end toward the bottom end of the U-shaped structure.

9. A vehicle as defined in claim 2, wherein the free end of each leg is engageable with a slot of a solid sheet, and the gasket seals the top of the slot upon engagement of the free end of each slot with the slot of said solid sheet.

10. A vehicle as defined in claim 9, wherein the sealing spring fastener further comprises barbs inside the closed cavity having a general direction from the top end toward the bottom end of the U-shaped structure.

11. A vehicle as defined in claim 2, wherein the sealing spring fastener further comprises barbs inside the closed cavity having a general direction from the top end toward the bottom end of the U-shaped structure.

12. A vehicle as defined in claim 1, wherein the elastic body comprises a compound selected from a group consisting of thermoplastic elastomer, silicone, polyurethane, plastisol, and a mixture thereof.

13. A vehicle as defined in claim 1, wherein the elastic body comprises a thermoplastic elastomer.

14. A vehicle as defined in claim 13, wherein the thermoplastic elastomer has been molded by injection molding.

15. A vehicle as defined in claim 1, wherein the free end of each leg is engageable with a slot of a solid sheet.

16. A vehicle as defined in claim 1, wherein the sealing spring fastener further comprises barbs inside the closed cavity having a general direction from the top end toward the bottom end of the U-shaped structure.

* * * * *